(12) United States Patent
Kemp et al.

(10) Patent No.: US 6,430,660 B1
(45) Date of Patent: Aug. 6, 2002

(54) UNIFIED MEMORY HARD DISK DRIVE SYSTEM

(75) Inventors: Timothy Michael Kemp; John Davis Palmer, both of San Jose; Roy Edwin Scheuerlein, Cupertino, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,961

(22) Filed: May 21, 1999

(51) Int. Cl.[7] ............................................. G06F 12/08
(52) U.S. Cl. ..................... 711/153; 711/129; 711/173; 711/113; 710/56
(58) Field of Search .......................... 711/112, 113, 711/114, 129, 153, 173; 710/53, 56; 714/769

(56) References Cited

U.S. PATENT DOCUMENTS

| | | | | |
|---|---|---|---|---|
| 5,465,343 A | * | 11/1995 | Henson et al. ............... | 711/112 |
| 5,640,343 A | | 6/1997 | Gallagher et al. ........... | 365/171 |
| 5,860,083 A | * | 1/1999 | Sukegawa ................... | 711/103 |
| 5,864,568 A | * | 1/1999 | Nemazie ...................... | 714/769 |
| 6,034,887 A | * | 3/2000 | Gupta et al. ................. | 365/171 |
| 6,065,096 A | * | 5/2000 | Day et al. .................... | 711/114 |
| 6,094,695 A | * | 7/2000 | Kornher ....................... | 710/56 |
| 6,157,984 A | * | 12/2000 | Fisher et al. ................. | 711/112 |
| 6,212,588 B1 | * | 4/2001 | Bruner et al. ................ | 710/110 |
| 6,219,750 B1 | * | 4/2001 | Kanamaru et al. .......... | 711/113 |

\* cited by examiner

*Primary Examiner*—Do Hyun Yoo
*Assistant Examiner*—Gary J. Portka
(74) *Attorney, Agent, or Firm*—Thomas R. Berthold, Esq.; Banner & Witcoff, Ltd.

(57) ABSTRACT

A disk controller system includes a microprocessor, a hard disk controller, a disk channel path, a host communications path, and an interface coupled to each of the microprocessor, hard disk controller, disk channel path and host communications path. A unified non-volatile memory is coupled to the interface that has a plurality of memory spaces. A memory space is allocated for each of the microprocessor, hard disk controller, disk channel path and host communications path. Each memory space is separated from another memory space by a programmable memory space boundary. The microprocessor, hard disk controller and the unified memory are all fabricated on a single substrate.

1 Claim, 3 Drawing Sheets

UNIFIED MEMORY HARD DISK DRIVE SYSTEM

BACKGROUND OF THE INVENTION

1. Field of the Invention

The present invention relates to the field of data storage. More particularly, the present invention relates to a memory configuration for a hard disk drive controller system.

2. Description of the Related Art

FIG. 1 shows an exemplary hard disk drive (HDD) system 10 having a conventional hard disk controller (HDC) system 20. HDD system 10 includes a hard disk 11 on which data is stored, an arm 12, a read/write head 13, an arm electronics (AE) circuit 14 and a hard disk controller (HDC) system 20. HDC system 20 is connected to read/write head 13 through AE circuit 14 by way of a disk channel path 16 and to a host computer system 18 through a host communications path 17.

FIG. 2 shows a schematic block diagram of a memory arrangement for a conventional HDC system 20. FIG. 2 shows that system 20 includes a hard disk controller (HDC) 21, an HDC buffer, or cache, memory 22, a microprocessor (μP) 23, a Read-Only Memory (ROM) instruction memory 24 for microprocessor 23, and a writable Random Access Memory (RAM) 25.

Requests for access to the memories of memory of HDC system 20 originate from four different sources: hard disk controller 21, microprocessor 23, disk channel path 16 and host communications path 17. Disk channel path 16 is the path by which data is written to and recovered from disk 11. Host communications path 17 is the interface for HDD system 20 with host system 18. Both hard disk controller 21 and microprocessor 23 tend to access the various memory spaces in a relatively diffuse pattern over widely separated positions within the memory spaces. Microprocessor 23 accesses HDC buffer memory 22 only by way of requests to hard disk controller 21, with data being passed by using registers within hard disk controller 21. In contrast to hard disk controller 21 and microprocessor 23, both disk channel 16 and host communications path 17 are high-speed interfaces capable of accessing many sequential positions of memory at a time.

Each of the different memory spaces of system 10 are conventionally provided on physically separate integrated circuit substrates, or chips. The physical separation of each memory is represented in FIG. 2 by dashed lines appearing around the respectively different components of system 20. For example, RAM 25 is separate from ROM 24, while ROM 24 conventionally is combined with microprocessor 23 on a single chip.

The physical separation of the memories is required because each respective memory space is fabricated using different technology, such as different mask levels and processing steps, and has a corresponding different operational performance characteristics. For example, HDC cache memory 22 requires a high bandwidth and capacity that is similar to that provided by dynamic RAM (DRAM) technologies. The ROM instruction memory 24 must be non-volatile, such as provided by ROM- or Flash-type memories. Finally, RAM 25 for microprocessor 23 must have a fast access and cycle time as provided by Static RAM (SRAM) memory. Additionally, the DRAM-, ROM- and Flash-type memories of FIG. 1 have processing steps that conflict with the normal processing of the logic devices of HDC system 20. When the processing steps for the memories are combined with the processing steps for the logic devices, performance compromises occur.

Occasionally, the memory granularity for each of the three different memory types used for a conventional HDC system does not match the requirements of the HDD and causes the system design to use more expensive memories than are optimal. The frequency of occurrence of a granularity mismatch between a conventional HDC memory and the requirements for an HDD system increases with time and will likely occur a twice as frequent or more within several years for desktop PC HDDs.

What is needed is a memory configuration that optimizes memory space within an HDC system.

SUMMARY OF THE INVENTION

The present invention provides a memory configuration that optimizes memory space within an HDC system. The advantages of the present invention are provided by a disk controller system that includes a microprocessor, a hard disk controller, a disk channel path, a host communications path, and an interface coupled to each of the microprocessor, hard disk controller, disk channel path and host communications path. A unified non-volatile memory is coupled to the interface that has a plurality of memory spaces. Preferably, the unified memory is formed from an array of magnetic tunnel junction memory cells. A memory space is allocated for each of the microprocessor, hard disk controller, disk channel path and host communications path. Each memory space is separated from another memory space by a programmable memory space boundary. According to the present invention, the microprocessor, hard disk controller and the unified memory are all fabricated on a single substrate.

The present invention also provides a method for controlling memory space in a unified memory of a disk controller system in which a first memory space is established in the unified memory. A second memory space is established in the unified memory, with the first and second memory spaces being separated by a memory space boundary. The memory space boundary is then changed with respect to the first and second memory spaces in response to an operational requirement of the disk controller system, such as a detected operational condition or a command received from a host system to the disk controller system. Accordingly, a third memory space can be established in the unified memory, with the third memory space being separated from one of the first and second memory spaces by a second memory space boundary. In this situation, the second memory boundary is changed in response to the operational requirement of the disk controller.

BRIEF DESCRIPTION OF THE DRAWING

The present invention is illustrated by way of example and is not limited by the accompanying figures in which like reference numerals indicate similar elements and in which.

DETAILED DESCRIPTION

Figure 1:
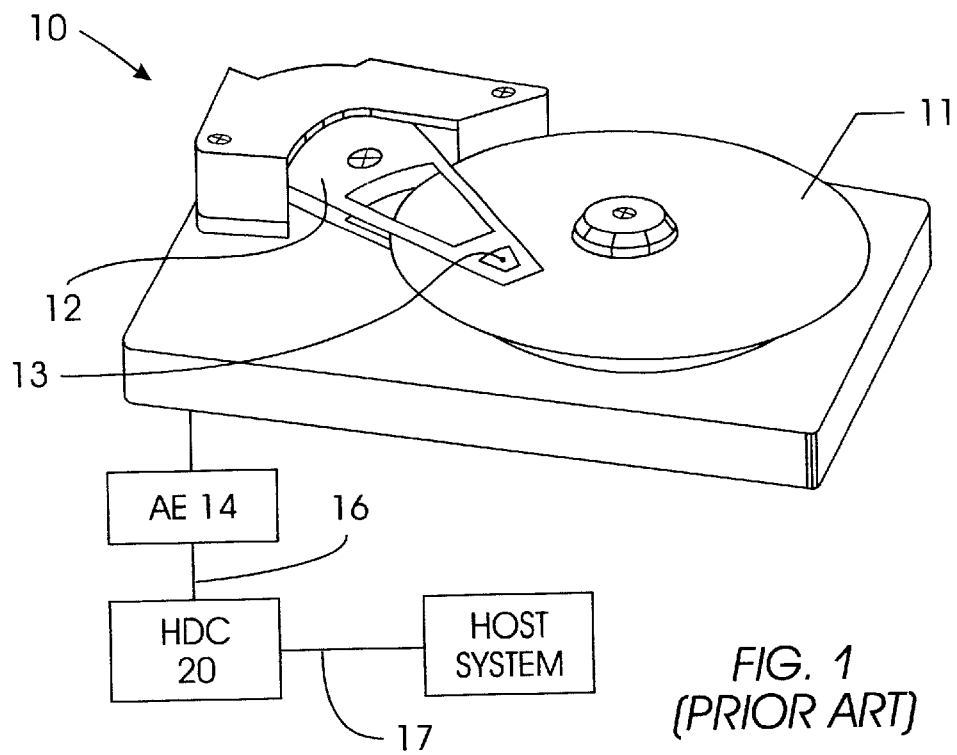
FIG. 1 shows an exemplary hard disk drive having a conventional HDC system.
Figure 2:
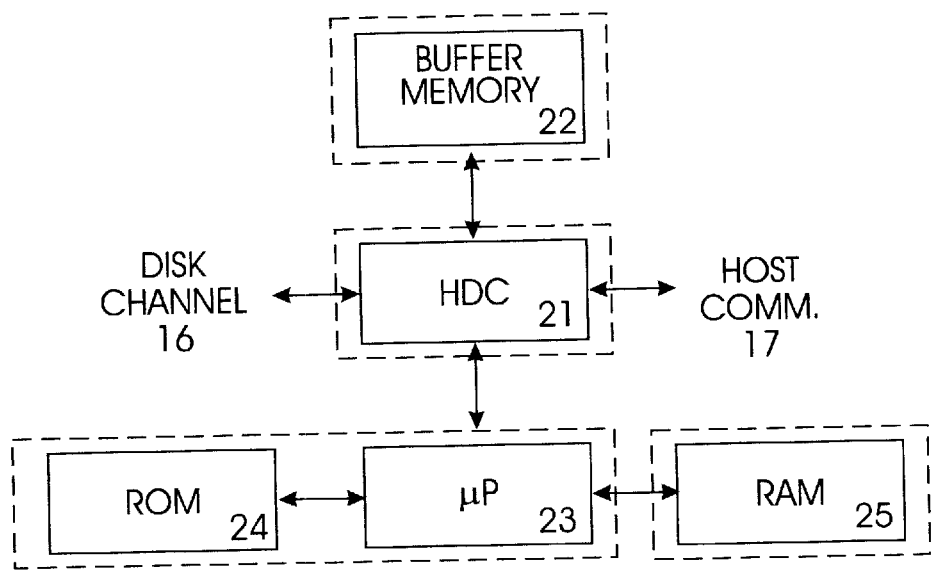
FIG. 2 shows a schematic block diagram of a memory arrangement for a conventional hard disk controller system for a hard disk drive.

The present invention provides a memory configuration that optimizes memory space for an hard disk controller (HDC) system of a hard disk drive (HDD) system. To achieve this, the present invention combines the memories of an HDC system so that the instruction ROM and the writable RAM that are associated with a microprocessor are unified with the cache memory of the hard disk controller to form a single nonvolatile, writable RAM memory that is fabricated on a single integrated circuit substrate, or chip.

With the memory unified and incorporated on a single chip, chip-to-chip delays associated with reading and writing data are eliminated, thereby providing a high-bandwidth interface with logic circuits of an HDC system and eliminating the expense associated with using separate chips for each respective memory space. Additionally, a fast access and cycle time for the microprocessor data memory and a high-bandwidth path for the buffers are simultaneously achieved.

The unified memory is fabricated on the same silicon substrate as the digital logic circuits of the HDD control logic, thus providing an HDC controller system that has a lower total power consumption than conventional HDC controller systems because a fewer number of chip drivers and buffers are used. Additionally, an HDC system according to the present invention requires far fewer I/0 pins than a conventional EDC system, thus enabling a lower cost package to be used. For example, a memory bus associated with an HDC of the present invention dissipates about 400 mW less and uses about 100 pins less than conventional approaches. Similarly, by integrating the ROM and RAM memories with the HDC microprocessor, about 350 mW less are dissipated and about 180 pins less are used than conventional approaches.

Further, the unified memory provides memory space for instructions and data space for the microprocessor, while also providing a buffer space for the respective interfaces to the disk channel and to host communications. The memory space used for the microcode and data space for the microprocessor differ from the memory spaces used for the interface buffers at any given time, but, according to the invention, the memory space boundaries are programmable and can be redefined during drive operation.

A disk write operation may be confirmed as being complete as soon as the data is in the cache buffer memory space because the unified memory is non-volatile, thus producing significant performance advantages for the system. Therefore, the hard disk controller 31 provides a signal indicating the confirmation on the host communication path before data is written to the disk. Conventional HDC systems do not confirm completion of a write operation until data is written to the disk.

When the drive is activated by the system, the unified memory contains instructions and parameters required for normal functioning of the HDD system, including responses indicating that the system must wait for the drive to recover from a standby state, or power-down mode, or a self maintenance mode. The recovery time from a total power-down state for an HDD system incorporating the present invention is faster than conventional hard disk drive systems because the non-volatile unified memory already contains the instructions necessary for normal microprocessor operations so that copying of data from the ROM instruction space to the working memory space for the microprocessor is avoided.

Figure 3:
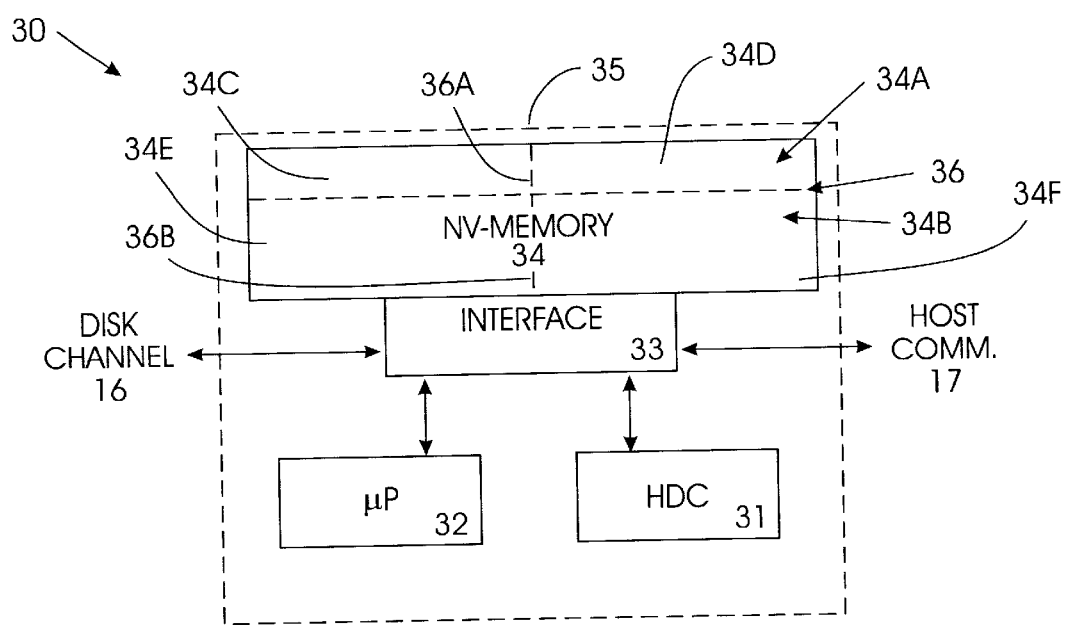
FIG. 3 is a schematic block diagram of a first memory arrangement for a hard disk drive controller system according to the present invention.

FIG. 3 is a schematic block diagram of a memory arrangement for a hard disk drive controller (HDC) system 30 according to the present invention. HDC system 30 replaces HDC system 20 in a hard disk drive system, such as exemplary HDD system 10 shown in FIG. 1. System 30 includes a hard disk controller 31, a microprocessor 32, an interface 33 and a unified memory 34 that are all fabricated on a single substrate, or chip represented by chip boundary 35. Unified memory 34 includes an instruction and data memory space 34a separated from a disk cache buffer space 34b by a programmable memory space boundary 36. Instruction and data memory space 34a is separated by a programmable memory space boundary 36a into a memory space 34c that is allocated to microprocessor 32 and a memory space 34d that is allocated to hard disk controller 31. Disk cache buffer space 34b is separated by a programmable memory space boundary 36b into a memory space 34e that is allocated to disk path 16 and a memory space 34f that is allocated to host communication path 17. Memory access requests for accessing unified memory 34 originate from four different sources: hard disk controller 31, microprocessor 32, disk channel path 16 and host communications path 17.

Unified memory 34 is preferably a writable non-volatile memory, such as an array of a magnetic tunnel junction (MTJ) memory cells. Suitable MTJ memory cells for unified memory 34 are disclosed in U.S. 5,640,343 to Gallagher et al., U.S. patent application Ser. No. 08/982,893 to Scheuerlein, filed Dec. 2, 1997, now U.S. Pat. No. 6,130,835, U.S. patent application Ser. No. 08/982,995 to Gallagher et al., filed Dec. 2, 1997 now U.S. Patent No. 5,991,193, and U.S. patent application Ser. No. 09/116,261 to Scheuerlein, filed Jul. 16, 1998, now U.S. Pat. No. 6,097,625, each of which are incorporated by reference herein.

A flexible memory space boundary permits the total memory bits of the unified memory to be reduced in comparison to conventional approaches for increased design efficiency. A memory space boundary can be reprogrammed depending upon the immediate operational requirements. For example, heuristics performed by microprocessor 32 can detect predetermined operating conditions and, based on the detected conditions, can reprogram the memory space boundaries by reprogramming hard disk controller 31. Similarly, microprocessor 32 can receive commands from the host system for reprogramming the memory space boundaries. Table 1 shows a comparison of memory attributes a conventional HDC system and an HDC system according to the present invention.

TABLE 1

| Attribute | Figure 1: Conventional Approach | Figure 3: Present Invention |
| --- | --- | --- |
| Total Memory | 192K Bytes. Separate chips. | 128K Bytes integrated. No separate chips. |
| ROM for Inst. | 32K Bytes Flash or ROM chip | zero |
| RAM for Inst. | 16K Bytes | 16K Bytes |
| RAM for data | 16K Bytes | 16K Bytes |
| Buffer Memory | 128K Bytes | 64K – 96K Bytes |

In the situation when a sector of a disk surface becomes defective, the conventional approach is to assign an alternate sector on the disk surface to the address of the defective sector for storing the data that was contained in the defective sector. Typically, the alternately-assigned sectors are located at some common part of the disk that is slow to access. In certain hard disk applications, throughput of data is important, so this approach as fundamental drawbacks. Another location where alternately-assigned sectors are typically located is at the end of every track on the disk, which consumes disk space inefficiently.

In contrast, the non-volatile unified memory of the present invention provides high-performance access by being capable having a part of the disk buffer cache memory space assigned an a secure alternate sector space so that a significant percentage of the disk surface is not required to be allocated for spare sectors. An additional benefit is that the microcode associated with an HDC system of the present invention is significantly simplified.

When the disk is otherwise idle, the non-volatile unified memory of the present invention may be used as a secure cache for reorganizing data stored on a hard disk. Sequentiality of data on the disk can be reestablished by bringing data moved to alternate sectors back into sequence. In contrast to the present invention, conventional HDC systems do not provide this feature securely in the face of power failures.

An HDD system according to the present invention can also be configured so that supplemental microcode and parameters are stored on the disk and are loaded into instruction and data space in unified memory for special modes of operation, such as maintenance and diagnostics. The memory space boundaries are adjusted accordingly to decrease the buffer memory space and to increase instruction and data memory space, as required, thereby avoiding the need for a larger total memory.

In another configuration, the unified memory of the present invention includes control logic for storing data for more than one row of memory cells in the first sense amplifiers. Portions of two memory spaces of the unified memory are made available to a fast page mode access when one of the two row addresses is requested in a subsequent access. Consequently, the delay in changing rows for memory requests from various logic functions in the HDD system of the present invention is reduced.

Figure 4:
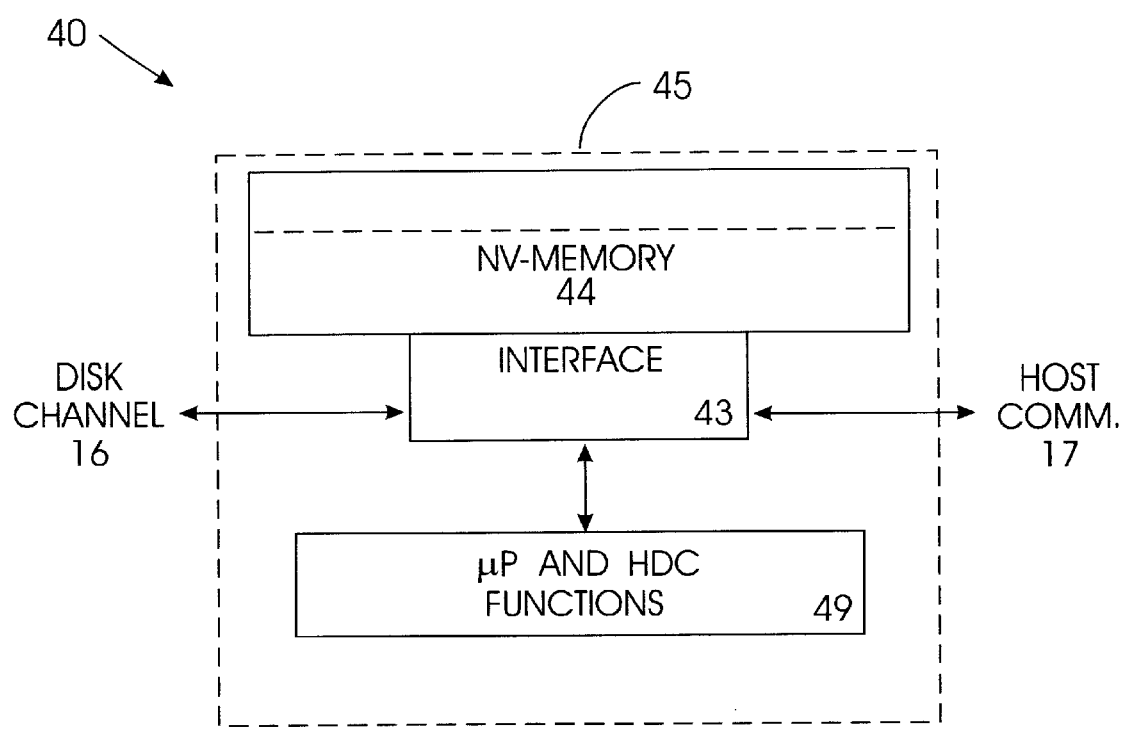
FIG. 4 is a schematic block diagram of a second memory arrangement for a hard disk drive controller system according to the present invention.

In another configuration shown in FIG. 4, microprocessor 32 and hard disk controller 31 are embodied as a single functional entity or unit 49. An interface 43 to the unified memory 44 carries out the same functions as interface 33 in FIG. 3, but can be simplified where there is duplication of lines, such as using common data lines.

In yet another configuration, the servo function for the HDD system is implemented in the microprocessor, using the instruction and data memory space within the unified memory. Therefore, the servo digital signal processor (DSP) with the associated ROM and RAM are not required.

While the present invention has been described in connection with the illustrated embodiments, it will be appreciated and understood that modifications may be made without departing from the true spirit and scope of the invention.

What is claimed is:

1. A disk drive, comprising:
   a disk storing data; and
   a hard disk controller system controlling data being written to and read from the disk, the hard disk controller system including
   a microprocessor;
   a hard disk controller;
   a disk channel path;
   a host communications path;
   an interface coupled to each of the microprocessor, hard disk controller, disk channel path and host communications path; and
   a unified memory coupled to the interface, the unified memory being a non-volatile memory including an array of magnetic tunnel junction memory cells and having a plurality of memory spaces, a memory space being allocated for each of the microprocessor, hard disk controller, disk channel path and host communications path, each memory space is separated from another memory space by a programmable memory space boundary, the memory space allocated to the microprocessor includes memory space for instructions and for data,
   the hard disk controller providing a signal on the host communications path that confirms completion of a write operation before data is written to the disk, and
   the microprocessor and the hard disk controller being combined into a single functional unit.

* * * * *